(12) United States Patent
Shumway

(10) Patent No.: US 7,775,536 B2
(45) Date of Patent: Aug. 17, 2010

(54) MOUNTED, MULTI-ANGLE, EXTENDABLE STEP

(76) Inventor: David L. Shumway, 848 W. 4050 North, Pleasant View, UT (US) 84414

( * ) Notice: Subject to any disclaimer, the term of this patent is extended or adjusted under 35 U.S.C. 154(b) by 381 days.

(21) Appl. No.: 12/006,361

(22) Filed: Jan. 2, 2008

(65) Prior Publication Data

US 2009/0014978 A1   Jan. 15, 2009

Related U.S. Application Data

(60) Provisional application No. 60/959,205, filed on Jul. 12, 2007.

(51) Int. Cl.
*B60R 3/00* (2006.01)
*B60R 3/02* (2006.01)
(52) U.S. Cl. .................... 280/164.1; 280/166
(58) Field of Classification Search ........... 280/164.1, 280/164.2, 166, 169, 163; 182/14, 15, 2.2, 182/91; 105/447, 444, 445
See application file for complete search history.

(56) References Cited

U.S. PATENT DOCUMENTS

| | | | | |
|---|---|---|---|---|
| 3,986,724 A | * | 10/1976 | Rivinius | 280/166 |
| 5,716,064 A | * | 2/1998 | Frerichs | 280/166 |
| 5,897,125 A | | 4/1999 | Bundy | |
| 5,927,433 A | | 7/1999 | Jaramillo, Sr. | |
| 6,170,843 B1 | | 1/2001 | Maxwell et al. | |
| 6,474,668 B2 | | 11/2002 | Debo | |
| 6,685,204 B1 | | 2/2004 | Hehr | |
| 6,769,704 B2 | | 8/2004 | Cipolla | |
| 6,986,523 B1 | * | 1/2006 | Bickford | 280/414.1 |
| 7,070,194 B2 | * | 7/2006 | Garland et al. | 280/166 |
| 7,114,736 B2 | * | 10/2006 | Stodola et al. | 280/164.1 |
| 7,195,262 B2 | * | 3/2007 | Chaudoin et al. | 280/166 |
| 7,219,911 B2 | | 5/2007 | Sukonthapanich et al. | |
| 2003/0038446 A1 | | 2/2003 | Anderson et al. | |
| 2004/0150184 A1 | * | 8/2004 | Bang et al. | 280/166 |
| 2005/0146112 A1 | * | 7/2005 | Bang et al. | 280/166 |

OTHER PUBLICATIONS

"Sure Step Trailer Step," TH Marine—2007 New Marine Accessory Product Brochure.
"Ball Mount Hitch Step," AutoSport Automotive Outfitters Early Summer 2007 Catalog; p. 40.

* cited by examiner

*Primary Examiner*—S. Joseph Morano
*Assistant Examiner*—John R Olszewski
(74) *Attorney, Agent, or Firm*—Pate Pierce & Baird

(57) ABSTRACT

This invention relates to mounted, adjustable steps for vehicles and, in particular, to a multi-angle, extendable, and selectively height-adjustable step that can be mounted to a trailer such as a boat trailer, a camping trailer, trailers for all-terrain vehicles and motorcycles, and the like. The adjustable step assembly of the present invention includes a mounting bracket, an extension member, and a step. The extension member includes a first end and a second end. The first end of the extension member being pivotably connect to the mounting bracket to facilitate selective pivoting with respect to the mounting bracket through a range of motion including a first position and a second position being higher than the first position. The step may be connected to the second end of the extension member and configured to provide at least a first stepping area and a second stepping area when the extension member is selectively positioned in the first and second positions, respectively. In one embodiment, the first and second stepping areas are substantially equivalent in surface area and aspect ratio.

22 Claims, 7 Drawing Sheets

MOUNTED, MULTI-ANGLE, EXTENDABLE STEP

RELATED APPLICATION

This application claims the benefit of U.S. Provisional Patent Application Ser. No. 60/959,205, filed Jul. 12, 2007, and entitled "MOUNTED, MULTI-ANGLE, EXTENDABLE STEP."

BACKGROUND

1. The Field of the Invention

This invention relates to mounted, adjustable steps for vehicles and, in particular, to a multi-angle, extendable, and selectively height-adjustable step that can be mounted to a trailer such as a boat trailer, a camping trailer, trailers for all-terrain vehicles and motorcycles, and the like.

2. The Background Art

Many vehicles include a trailer hitch or hitch receiver for pulling trailers. Trailer hitches are often used to pull a boat trailer, a camping trailer, a motorcycle trailer, an all-terrain vehicle trailer, a bike trailer, a luggage trailer, etc. The cargo (e.g., boats, motorcycles, all-terrain vehicles, bicycles, luggage or the like) carried by such vehicles is often manually strapped, or otherwise attached, to the bed or receiving portion of the trailer. Accordingly, those using such trailer systems often find themselves climbing up and standing on some part of the towing vehicle or the trailer in order to load the vehicle or trailer, cover the contents of the trailer, strap, or otherwise attach, cargo to the trailer, or the like. This is often inconvenient and may ultimately lead to injuries. For example, with insufficient or poorly placed foot support, a person may fall and, accordingly, become injured. Likewise, ankles may be twisted or shins bruised. Also, a fall or misstep may result in cargo being damaged, falling, or tipping over that may cause injuring to the person who fell or slipped from the vehicle or trailer or a bystander.

Various hitch mounted step assemblies are known in the art. Some prior art assemblies include a step that attaches to a hitch receiver. Other assemblies have an extendable step that can be extended for use and retracted after use for storage. Additionally, some prior art step assemblies include a step that is pivotable between a storage position and a position for supporting a user. Still other prior art step assemblies include a step that facilitates easier access to the tailgate of the vehicle. Such prior art assemblies often do not provide any access to areas located a significant distance away from the receiver hitch mounted on the towing vehicle. Accordingly, the utility of such prior art step assemblies may be limited in function. For example, such assemblies do not take into consideration the need for complete adjustability relative to height. For example, different tasks may require different step height placements for optimum access and to ensure the safety of the user.

Based on the foregoing, what is needed is a step assembly that is adjustable with respect to angle of extension (e.g., height) and extension length to properly support a user in various positions. Also what is needed is a simple, cost-effective, adjustable step that can be attached to a vehicle trailer, while still maintaining full functionality while supporting a user.

SUMMARY OF THE INVENTION

When the living standard increases, people acquire more recreational vehicles. An important factor for full enjoyment of these recreational vehicles is safety and convenience. Many recreational vehicles are transported on trailers. Additionally, placing recreational vehicles on trailers is a common method of storing recreational vehicles for longer periods of time, such as in somebody's backyard, in winter storage, and on somebody's property. People usually enter and exit the recreational vehicles while they are located on trailers. The process of entering and exiting recreational vehicles supported on a trailer are generally inconvenient and may be potentially dangerous. The present invention minimizes the danger of injury and also facilitates increased convenience in the process.

In selected embodiments, a step assembly in accordance with the invention may include a mounting bracket connecting the assembly to a trailer or other vehicle, a extension member comprising a first end and a second end. The first end of the extension member may pivotably connect to the mounting bracket. In selected embodiments, the extension member may selectively pivot with respect to the mounting bracket through a range of motion comprising a first position and a second position. The second position may be distinct from the first position. For example, in one embodiment, the second position may be generally higher than the first position. Furthermore, the range of motion may be bounded at one end by a first extreme position and bounded at the other end by a second extreme position. The first extreme position may be the first position and the second extreme position may be the second position.

A step assembly may further include a step connected to the second end of the extension member. A step may present first and second stepping areas when the extension member is the first and second positions, respectively. In certain embodiments, the first and second stepping areas may be substantially equivalent in surface area and aspect ratio.

In selected embodiments, an extension member may be extensible. For example, an extension member may comprise a housing and a slide. A slide may selectively translate within a housing. An adjustable step may further include a first lock selectively fixing the position of the slide with respect to the housing. Also, an adjustable step may include a second lock selectively fixing the position of the extension member with respect to the mounting bracket.

A slide of a step assembly may be connected to a step, which may comprise a cross member secured to the slide. A cross member may comprise a cylinder having an exterior surface. Additionally, a step may comprise a non-slip material applied to substantially completely cover the exterior surface.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE INVENTION

Figure 1:
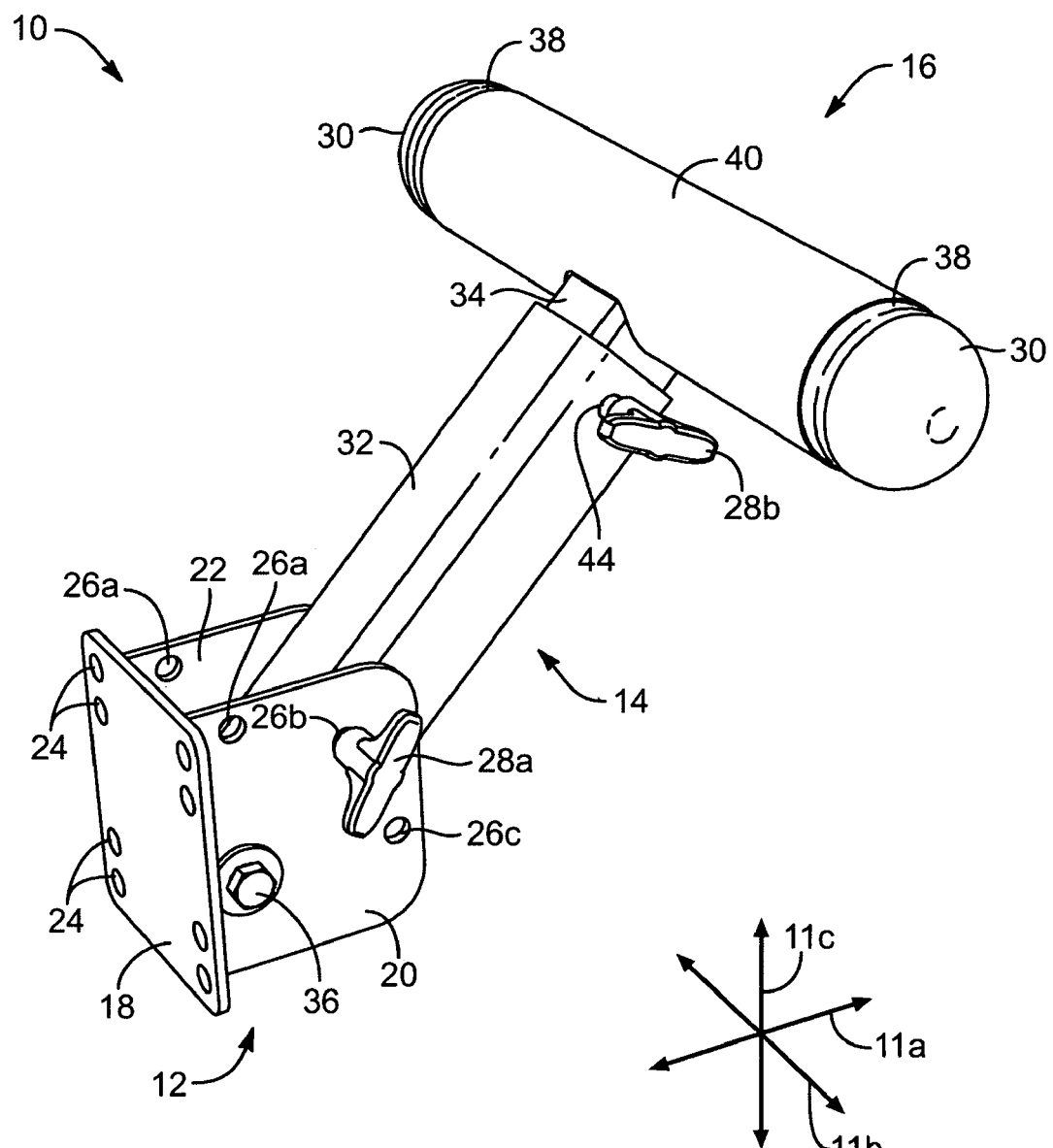
FIG. 1 is a perspective view of one embodiment of an adjustable step assembly in accordance with the invention with the extension member locked at 45° with respect to horizontal.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, but is merely representative of various embodiments of the invention. The illustrated embodiments of the invention will be best understood by reference to the drawings, wherein like parts are designated by like numerals throughout.

Referring to FIG. 1, an apparatus 10 in accordance with the invention may be defined in terms of coordinate axes 11. Such an axes 11 may include a longitudinal direction 11a, a lateral direction 11b, and a transverse direction 11c. The longitudinal direction 11a, lateral direction 11b, and transverse direction 11c may be substantially orthogonal to one another.

An apparatus 10 in accordance with the present invention may include a mounting bracket 12, an extension member 14, and a step 16. In selected embodiments, the mounting bracket 12 may be secured to a vehicle such as a trailer. An extension member 14 may connect to the mounting bracket 12 and extend to engage and support the step 16. In certain embodiments, the extension member 14 may pivotably connect to the mounting bracket 12. Accordingly, by pivoting the extension member 14 with respect to the mounting bracket 12, the positioning of the step 16 may be determined or controlled. Also, in selected embodiments, the extension member 14 may be extensible. That is, the extension member 14 may have an adjustable length, providing another adjustment or degree of freedom for controlling or optimizing the positioning of the step 16 relative to the mounting bracket 12 secured to the vehicle or trailer.

Figure 2:
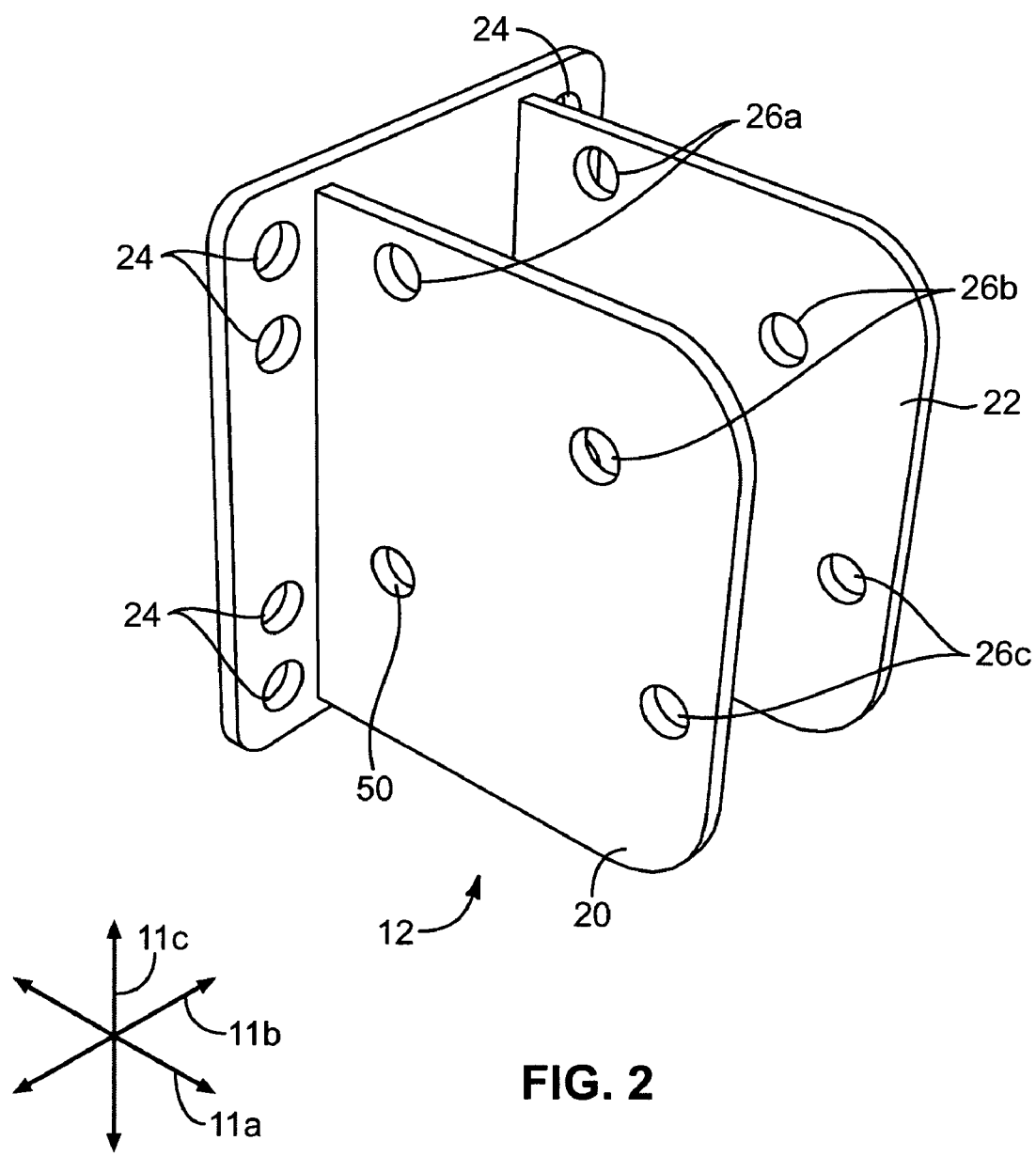
FIG. 2 is a perspective view of an embodiment of a mounting bracket in accordance with the invention.
Figure 3:
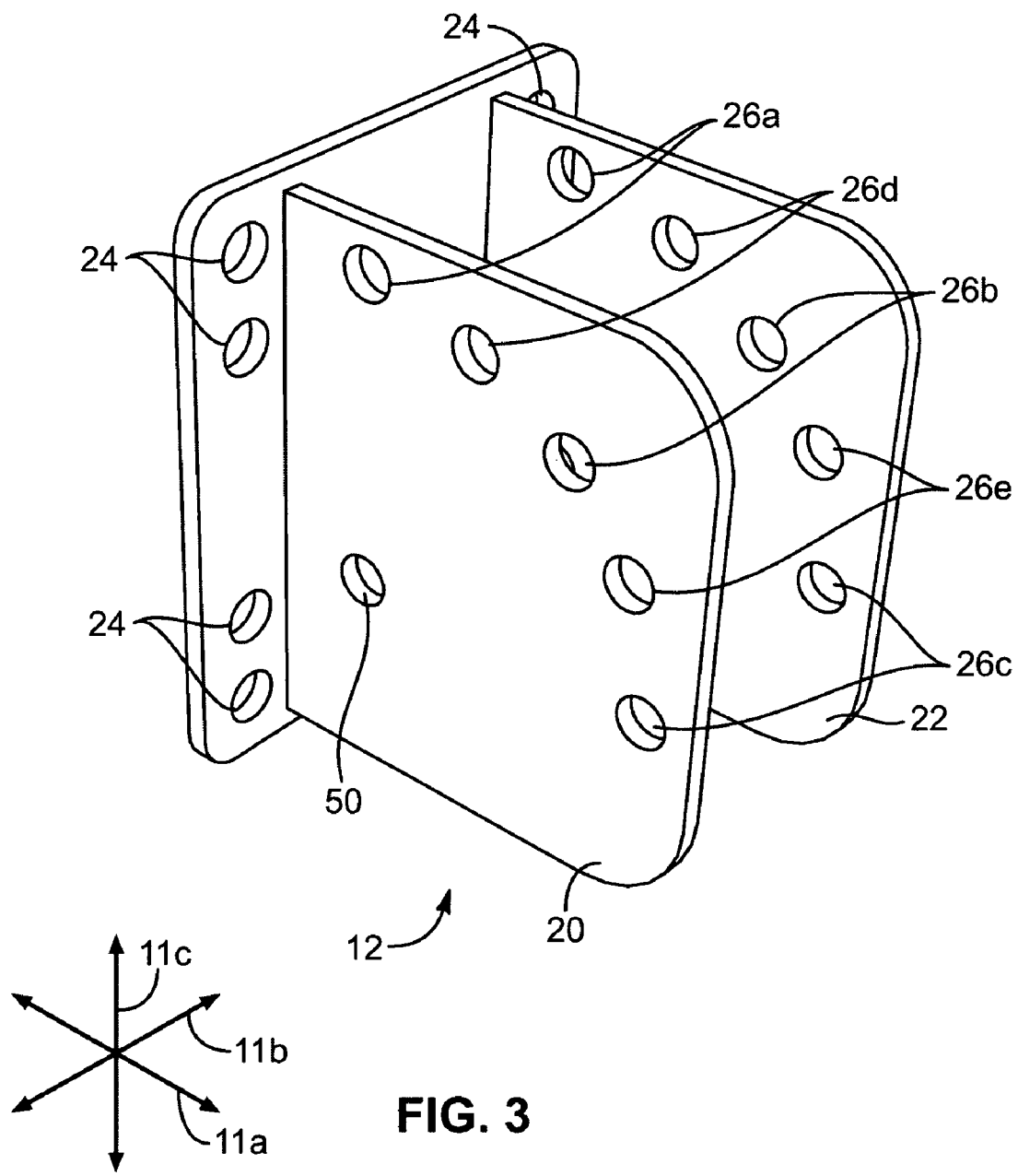
FIG. 3 is a perspective view of an alternative embodiment of a mounting bracket in accordance with the invention.

Referring to FIGS. 1-3, a mounting bracket 12 may be formed of any suitable material. Suitable materials may be selected to provide a desired strength, rigidity, formability, cost, resistance to corrosion, and/or the like. In selected embodiments of the present invention, the mounting bracket 12 may be formed of a metal or metal alloy, such as, for example and not by way of limitation, aluminum or steel.

In certain embodiments, the mounting bracket 12 may include a base plate 18, a first flange 20, and a second flange 22. The first and second flanges 20, 22 may be connected to extend from the same side of the base plate 18. The flanges 20, 22 may be connected to the base plate 18 in any suitable manner. For example, the flanges 20, 22 may be welded to the base plate 18. Alternatively, the base plate 18 and flanges 20, 22 may be machined, cast, molded, or otherwise formed as a single, monolithic unit.

The base plate 18 may be configured in such a manner so as to abut some portion of a vehicle or trailer. For example, in one embodiment, the base plate 18 may abut at least a portion of the frame forming the structural foundation of the vehicle or trailer. The base plate 18 may be securely fixed or selectively connected to a vehicle or vehicle trailer in any suitable manner. For example, the base plate 18 may be securely welded to the vehicle or trailer. Alternatively, the base plate 18 may include one or more apertures 24 having an internal periphery sufficient for receiving at least a portion of the length of a fastener (e.g., U-bolt, lag bolts, or the like) therein. The fasteners passing through apertures 24, respectively, may be received into receiving apertures formed in the frame of the vehicle or trailer. As will be appreciated, the base plate 18 of the mounting bracket 12 may be securely fixed or selectively connected to one of the sides or, in the alternative, to the top of the frame of the vehicle or trailer.

In selected embodiments, the first and second flanges 20, 22 may each include a pivot aperture 50 and a plurality of locking apertures 26. In one embodiment, a pivot pin 36 (e.g., bolt 36) may pass through the pivot apertures 50 of the first and second flanges 20, 22 to pivotably secure an extension member 14 between the first and second flanges 20, 22. The plurality of locking apertures 26 may provide an array of locations or angles at which an extension member 14 may be locked with respect to the mounting bracket 12.

For example, in selected embodiments, the first and second flanges may each include three locking apertures 26a, 26b, 26c. When a corresponding aperture in an extension member 14 aligns with a pair of locking apertures 26 of the first and second flanges 20, 22, a locking pin 28a may be inserted therethrough and secured. Accordingly, in an embodiment where the first and second flanges 20,22 each include three locking apertures 26a, 26b, 26c, an extension member 14 may be locked in three different locations with respect to the mounting bracket 12. In one embodiment, the three apertures 26a, 26b, 26c may be positioned to lock the extension member 14 in a horizontal extension, a 45° extension, and a vertical extension. However, with the addition of other locking apertures 26d, 26e, a greater number of locking positions between a mounting bracket 12 and an extension member 14 may be provided.

Referring to FIGS. 4-7, an extension member 14 may be formed of any suitable material. Suitable materials may be selected to provide a desired strength, rigidity, formability, cost, resistance to corrosion, or the like. In selected embodiments, a mounting bracket 12 may be formed of a metal or metal alloy.

An extension member 14 in accordance with the present invention may be extensible or inextensible. In selected extensible embodiments, an extension member 14 may include a housing 32 and a slide 34. The housing 32 and slide 34 may be configured such that the slide 34 selectively translates within the housing 32. In certain embodiments, an interface between a housing 32 and a slide 34 may preclude excessive play therebetween. For example, an elastomeric or polymeric interface may be position between the housing 32 and slide 34 to dampen or preclude any noise or wear due to relative vibration therebetween. Alternatively, the tolerances between the interior of the housing 33 and the exterior of the slide 34 may be selected to substantially preclude excessive play therebetween.

In selected embodiments, a locking pin 28b may secured a slide 34 with respect to a housing 32 to provide a desired length of the extension member 14. For example, in one embodiment, a slide 34 may include an array of locking apertures 42. A housing 32 may also include a locking aperture 44. Accordingly, when a locking aperture 42 of the slide 34 aligns with a locking aperture 44 of the housing 32, a locking pin 28b may be inserted therethrough and secured.

An array of locking apertures 42 may provide different positions at which a slide 34 may be secured to a housing 32.

For example, in one embodiment as illustrated 5, the slide 34 may include five locking apertures 42a, 42b, 42c, 42d, 42e formed in a first side. Alternatively, as shown in the embodiment illustrated in FIG. 7, the slide 134 may include five locking apertures 52a, 52b, 52c, 52d, 52e formed in a second side of the slide 134 and being spaced apart from each other in such a manner so as to corresponding to the spacing of the locking apertures 42a, 42b, 42c, 42d, 42e formed in the first side of the slide 134. Each locking aperture 42a, 42b, 42c, 42d, 42e, 52a, 52b, 52c, 52d, 52e may correspond to a different overall length of the extension member 14 relative to the housing 32. By way of providing an array of locking apertures 42a, 42b, 42c, 42d, 42e, 52a, 52b, 52c, 52d, 52e along two adjacent sides of the slide 134, respectively, provides a structural means to allow a user to selectively adjust the direction of the step 16 (i.e., horizontal or vertical) relative to the disposition of the frame of the vehicle or trailer to which the present apparatus is mounted.

Figure 4:
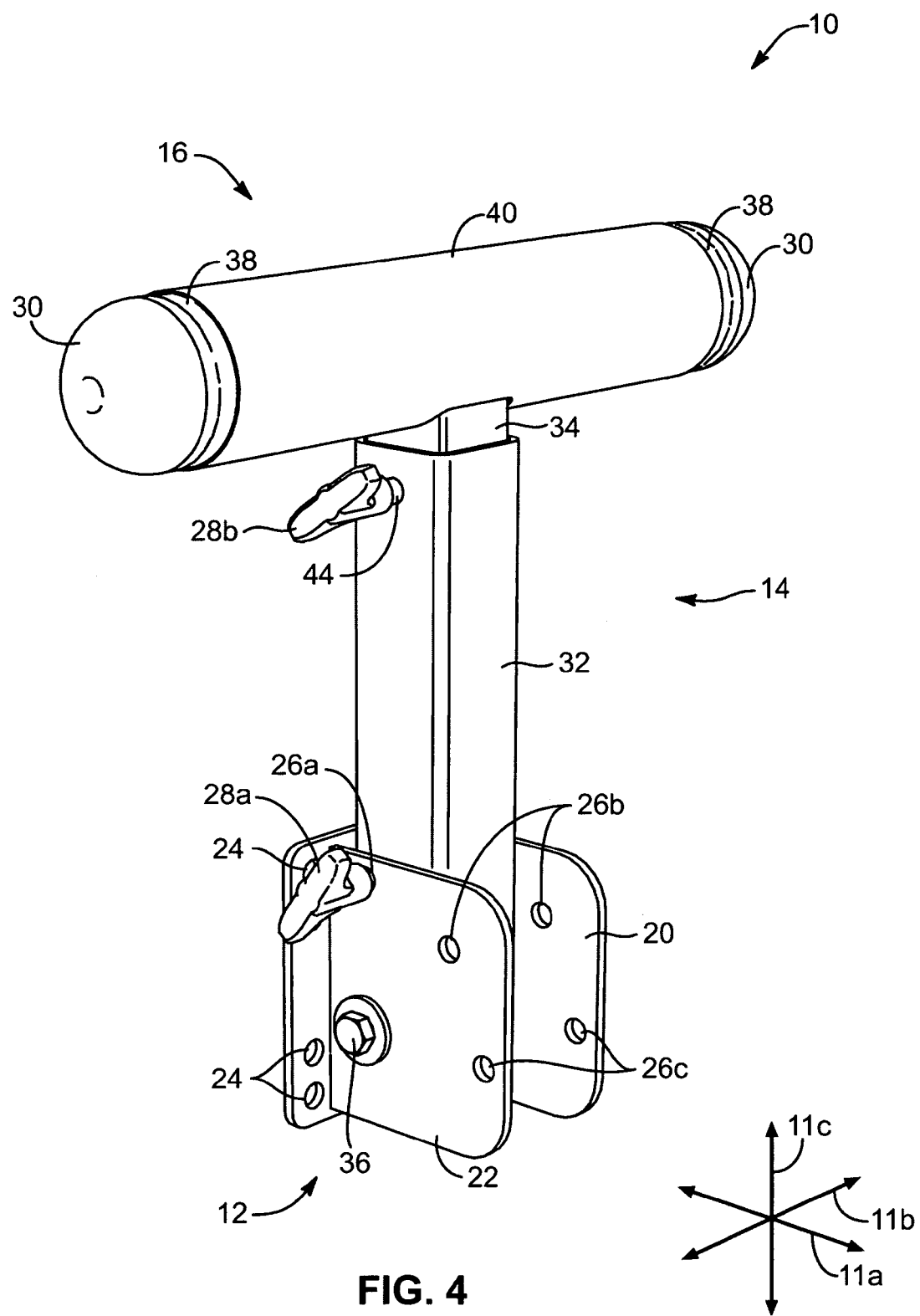
FIG. 4 is a perspective view of the step assembly of FIG. 1 with the extension member locked in a vertical position.
Figure 5:
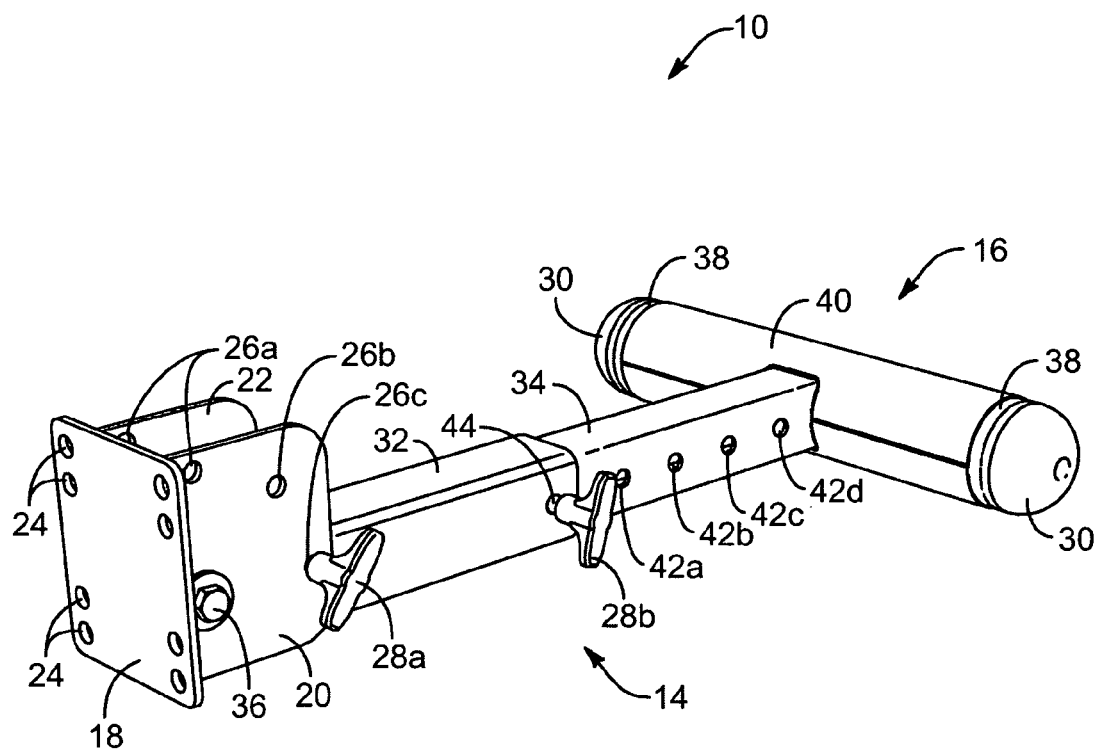
FIG. 5 is a perspective view of the step assembly of FIG. 1 with the extension member fully extended and locked in a horizontal position.
Figure 5:
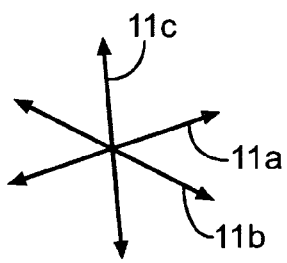
Figure 6:
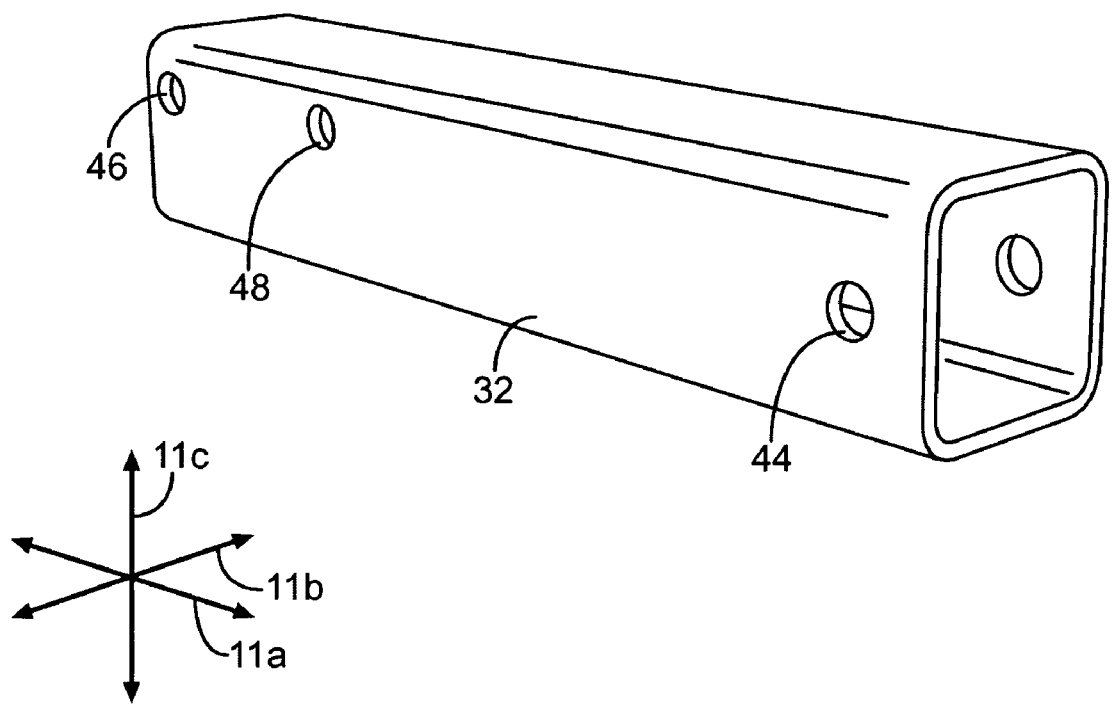
FIG. 6 is a perspective view of an embodiment of a housing of an extension member in accordance with the invention.
Figure 7:
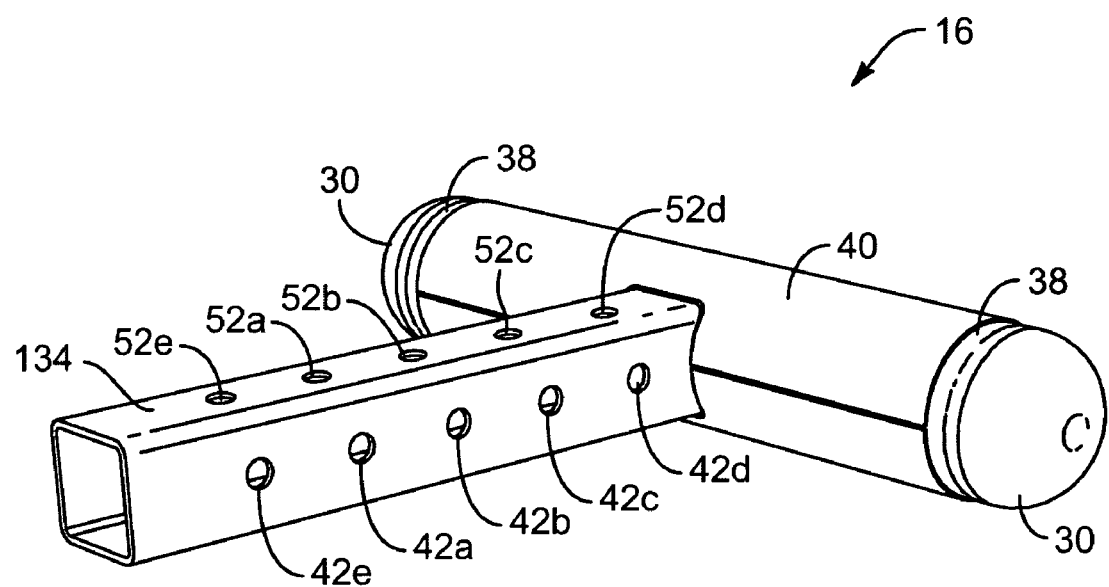
FIG. 7 is a perspective view of an embodiment of slide of an extension member attached to a step in accordance with the invention.

An extension member 14 may include other apertures as desired or necessary. For example, in selected embodiments, an extension member 14 may include a pivot aperture 46 as shown in FIGS. 4-6. The pivot aperture 46 of the extension member 14 may align with the pivot aperture 50 of the mounting bracket 12 so as to receive at least a portion of the length of a bolt (as part of an engagement assembly including a locking nut) or a selectively removable pivot pin 36. Similarly, the extension member 14 may include a locking aperture 48. The locking aperture 48 of the extension member may align with a locking aperture 26 of the mounting bracket 12 to receive at least a portion of the length of a bolt (as part of an engagement assembly including a locking nut) or a selectively removable pivot pin 28a.

In certain embodiments, the locking pin 28 in accordance with the present invention may be a shear pin having a size and shape sufficient to withstand loads that may be applied thereto. In one embodiment, the locking pin 28 may comprise a metallic shank connected to a handle. The handle may comprise an extension of the metallic shank or may be formed of a dissimilar material such as a polymeric material. In selected embodiments, a locking pin 28 may be configured to resist inadvertent removal from the locking aperture 26, 42. For example, a locking pin may include a biased detent mechanism. Alternatively, a locking pin 28 may include an aperture extending therethrough at an end opposite the handle. The aperture may be sized to receive a cotter pin.

Consistent with the foregoing structural configuration, the extension member 14, 114 and the step 16 may be selectively disposed in relation to the mounting bracket 12, whereby the removal of the pivot pin 36 and the locking pin 28 from its retaining engagement between the extension member 14, 144 and the mounting bracket 12 allows the disengagement therebetween. Thus, if desired, the extension member 14, 114 and the step 16 can be removed from engagement with the mounting bracket 12 and stored. Selectively removing the extension member 14, 114 and step 16 from engagement with the mounting bracket 12 may also provide a safer environment when the vehicle or trailer is being moved or transported from one destination to another.

As best illustrated in FIGS. 1, 4, 5 and 7, the extension member 14 may be connected to the step 16 in any suitable manner. For example, the extension member 14 may be welded or otherwise securely connected to the step 16. In selected embodiments, the slide 34 portion of an extension member 14 may be secured (e.g., welded) to the step 16.

In certain embodiments, a step 16 in accordance with the present invention may include a cross member 38, end caps 30, and a non-slip surface material 40. In one embodiment, a cross member 38 may be extend in a lateral direction 11b and have a circular cross section. In such an embodiment, the end caps 30 may be formed as hemisphere attached to, or inserted within, the ends of the cross member 38. The end caps 30 may be formed of any suitable material. For example, the end caps 30 may be formed of a polymeric material.

In selected embodiments, a non-slip material 40 may be grip tape applied to the exterior of the cross member 38. In certain embodiments, the non-slip material 40 may substantially completely cover the cross member 38. Accordingly, throughout the various positions at which a step 16 may be positioned and locked, the step 16 may present to a user the same amount of surface area covered with non-slip material. That is, throughout the various positions at which a step 16 may be positioned and locked, the step 16 may always provide to a user a consistent stepping surface with respect to dimension (surface area, length, width), contour (curvature of the cross member 38), and non-slip material 40. In selected embodiments, the non-slip material 40 may communicate a trade name. For example, in one embodiment, a trade name may be cut through the non-slip material such that a contrasting color of the cross member may be seen therethrough and form the desired letters or symbols.

In operation, a user may approach a step assembly 10 in accordance with the present invention attached to a vehicle. The user may remove a locking pin 28a and pivot an extension member 14 to a desired angle or position with respect to the mounting bracket 12. At the desired angle or position, the user may fine tune the position of the extension member 14 with respect to the mounting bracket 12 until the nearest locking apertures 26, 48 align. Upon alignment, the locking pin 28a may be reinserted and secured (e.g., with a detent, cotter pin, or the like).

The user may then adjust the length of the extension member 14 as desired. That process may include removing a locking pin 28b, translating a slide 34 within a housing 32 to reflect a desired length for the extension member 14, fine tuning the position of the slide 34 with respect to the housing 32 until the nearest locking apertures 42, 44 align, and reinserting and securing the locking pin 28b. This task of adjusting the length of an extension member 14 may precede or follow the step of adjusting the position of the extension member 14 with respect to the mounting bracket 12. Alternatively, in embodiments where the extension member 14 is inextensible, this task may be omitted.

Once the step assembly 10 has been locked in the position desired by the user, the user may step onto the cross member 38 to perform the desired labor. Once the labor is completed and the step assembly 10 is no longer needed, the step assembly 10 may be returned to a stowed position. That may be done following a similar process as that outlined hereinabove. In a stowed position 10, a step assembly 10 may be positioned and locked such that it will not undesirably contact or interfere with persons walking thereby or detract from the functionality or safety of the vehicle.

The present invention may be embodied in other specific forms without departing from its fundamental functions or essential characteristics. The described embodiments are to be considered in all respects only as illustrative, and not restrictive. All changes which come within the meaning and range of equivalency of the illustrative embodiments are to be embraced within their scope.

What is claimed and desired to be secured by United States Letters Patent is:

1. An adjustable step assembly, said assembly comprising:
 a mounting bracket;

an extension member configured to be extensible and comprising a first end and a second end, said first end pivotably connected to said mounting bracket, said extension member selectively pivoting with respect to the mounting bracket through a range of motion comprising at least a first position and a second position, wherein said second position being relatively higher than said first position;

said extension member comprising a housing and a slide, wherein said slide selectively translates within said housing;

a step connected to said second end of said extension member; and said step configured to provide a first stepping area and a second stepping area when said extension member is selectively positioned in said first and second positions, respectively, and wherein said first and second stepping areas being substantially equivalent in surface area and aspect ratio.

2. The adjustable step assembly as defined in claim 1, further comprising a first lock selectively fixing a position of the slide with respect to said housing.

3. The adjustable step assembly as defined in claim 2, further comprising a second lock selectively fixing a relative position of said extension member with respect to said mounting bracket.

4. The adjustable step assembly as defined in claim 2, wherein said slide having a length comprising an array of spaced apart locking apertures formed along said length, each of said locking apertures selectively fixing a different position of the slide with respect to said housing.

5. The adjustable step assembly as defined in claim 4, wherein said slide comprises a first side length including said locking apertures.

6. The adjustable step assembly as defined in claim 5, wherein said slide comprises a second side length adjacent said first side length and including a second array of spaced apart locking apertures.

7. The adjustable step assembly as defined in claim 6, wherein said step comprises a cross member secured to the slide.

8. The adjustable step assembly as defined in claim 7, wherein said cross member comprises a cylinder having an exterior surface.

9. The adjustable step assembly as defined in claim 8, wherein said step further comprises a non-slip material applied to substantially completely cover said exterior surface.

10. The adjustable step assembly as defined in claim 9, wherein said range of motion is bounded at one end by a first extreme position and bounded at an opposing end by a second extreme position.

11. The adjustable step assembly as defined in claim 10, wherein said first extreme position is said first position and said second extreme position is said second position.

12. The adjustable step assembly as defined in claim 11, wherein said range of motion further comprises at least one position between said first extreme position and said second extreme position.

13. An adjustable step assembly, said assembly comprising:

a mounting bracket;

an extension member configured to be extensible and comprising a first end and a second end, said first end pivotably connected to said mounting bracket, said extension member selectively pivoting with respect to the mounting bracket through a range of motion comprising at least a first position and a second position, wherein said second position being relatively higher than said first position;

a step connected to said second end of said extension member; and said step configured to provide a first stepping area and a second stepping area when said extension member is selectively positioned in said first and second positions, respectively, and wherein said first and second stepping areas being substantially equivalent in surface area and aspect ratio.

14. The adjustable step assembly as defined in claim 13, wherein said extension member comprises a housing and a slide, wherein said slide selectively translates within said housing.

15. The adjustable step assembly as defined in claim 14, further comprising a first lock selectively fixing a position of the slide with respect to said housing.

16. The adjustable step assembly as defined in claim 15, further comprising a second lock selectively fixing a relative position of said extension member with respect to said mounting bracket.

17. The adjustable step assembly as defined in claim 16, wherein said slide having a length comprising an array of spaced apart locking apertures formed along said length, each of said locking apertures selectively fixing a different position of the slide with respect to said housing.

18. The adjustable step assembly as defined in claim 17, wherein said slide comprises a first side having a length including said spaced apart locking apertures.

19. The adjustable step assembly as defined in claim 13, wherein said step further comprises a non-slip material applied to substantially completely cover said exterior surface.

20. The adjustable step assembly as defined in claim 13, wherein said range of motion is bounded at one end by a first extreme position and bounded at an opposing end by a second extreme position.

21. The adjustable step assembly as defined in claim 20, wherein said first extreme position is said first position and said second extreme position is said second position.

22. The adjustable step assembly as defined in claim 21, wherein said range of motion further comprises at least one position between said first extreme position and said second extreme position.

* * * * *

UNITED STATES PATENT AND TRADEMARK OFFICE
CERTIFICATE OF CORRECTION

| | | |
|---|---|---|
| PATENT NO. | : 7,775,536 B2 | Page 1 of 1 |
| APPLICATION NO. | : 12/006361 | |
| DATED | : August 17, 2010 | |
| INVENTOR(S) | : David L. Shumway | |

It is certified that error appears in the above-identified patent and that said Letters Patent is hereby corrected as shown below:

Title page, item [57] Abstract, line 9, delete "connect", and insert therefore -- connected --.

At column 1, line 37, delete "injuring", and insert therefore -- injury --.

At column 2, line 9, delete "are", and insert therefore -- is --.

At column 2, line 15, delete "a" [second occurrence], and insert therefore -- an --.

At column 2, line 31, after "is", insert -- positioned in --.

At column 4, line 52, delete "position", and insert therefore -- positioned --.

At column 4, line 58, delete "secured", and insert therefore -- secure --.

At column 5, line 1, after "illustrated", insert -- in FIG. --.

At column 5, line 7, delete "corresponding", and insert therefore -- correspond --.

At column 6, line 1, delete "extend", and insert therefore -- extended --.

At column 6, line 3, delete "hemisphere", and insert therefore -- hemispheres --.

Signed and Sealed this
First Day of February, 2011

David J. Kappos
*Director of the United States Patent and Trademark Office*